United States Patent
Cimino et al.

(10) Patent No.: US 7,372,813 B1
(45) Date of Patent: May 13, 2008

(54) VIRTUAL LOAD BALANCING ACROSS A NETWORK LINK

(75) Inventors: Daniel J. Cimino, Oak Park, CA (US); Stephen R. Haddock, La Honda, CA (US); Matthew T. Knudstrup, Camarillo, CA (US)

(73) Assignee: Extreme Networks, Santa Clara, CA (US)

( * ) Notice: Subject to any disclaimer, the term of this patent is extended or adjusted under 35 U.S.C. 154(b) by 1048 days.

(21) Appl. No.: 10/306,286

(22) Filed: Nov. 26, 2002

(51) Int. Cl.
*H04J 1/16* (2006.01)

(52) U.S. Cl. ...................... 370/235; 370/389

(58) Field of Classification Search ............ 370/235, 370/229, 230, 236.2, 236.1, 237, 389, 395.54, 370/471, 474, 535
See application file for complete search history.

(56) References Cited

U.S. PATENT DOCUMENTS 6,353,593 B1 * 3/2002 Chen et al. ............ 370/216
6,567,413 B1 * 5/2003 Denton et al. ............ 370/401
2002/0186656 A1 * 12/2002 Vu ............................ 370/229

* cited by examiner

*Primary Examiner*—Chi Pham
*Assistant Examiner*—Alexander O. Boakye
(74) *Attorney, Agent, or Firm*—Blakely Sokoloff Taylor & Zafman

(57) ABSTRACT

Information is directed across the same corresponding virtual channels in both a first network switch and a second network switch. As a result, any congestion in the second network switch results only in packet dropping associated with the particular congested virtual channel. However, information continues to move across the remaining uncongested virtual channels. As a result, even if congestion occurs in the second network switch, information continues to flow across the single network link between the first and second network switches, i.e., the single network link is not shut down.

18 Claims, 3 Drawing Sheets

US 7,372,813 B1

VIRTUAL LOAD BALANCING ACROSS A NETWORK LINK

BACKGROUND OF THE INVENTION

1. Field of the Invention

The present invention relates generally to load balancing in a network device.

2. Description of the Related Art

FIG. 1 is a schematic diagram of a network 100 in accordance with the prior art. Network 100 includes a plurality of transmitting network devices X1-Xn, which transmit information over network 100 using network switches 104, 106.

Transmitting network devices X1-Xn are coupled by a plurality of network device links 108 to network switch 104. Illustratively, network device links 108 are 100 Mb/s links. Network switch 104 arbitrates and allocates bandwidth between network device links 108 and thus transmitting network devices X1-Xn.

Network switch 104 is coupled to network switch 106 with a network link 110, e.g., a 1 Gb/s ethernet link. A plurality of receiving network devices R1-Rn are coupled by a plurality of network device links 114 to network switch 106. Illustratively, network device links 114 are also 100 Mb/s links. Network switch 106 arbitrates and allocates bandwidth between network device links 114 and thus receiving network devices R1-Rn.

Network 100 is susceptible to congestion which effectively shuts down network link 110 between network switch 104 and network switch 106. For example, assume a case where transmitting network devices X1 and X2 each send 100 Mb/s traffic, for a total of 200 Mb/s, destined for receiving network device R1. Since network device link 114 between receiving network device R1 and network switch 106 is a 100 Mb/s link, congestion occurs in network switch 106.

As a result of this congestion, network switch 106 drops incoming packets until the congestion is alleviated. However, during this time, network link 110 between network switch 104 and network switch 106 is effectively shut down.

To minimize loss of bandwidth, in certain applications, a plurality of network links 110A (as indicated by the dash lines) between network switch 104 and network switch 106 are used. Network switch 104 load balances the network traffic between network switch 104 and network switch 106 on the plurality of network links 110A using any one of a number of techniques, e.g., a hashing algorithm.

If congestion occurs, one or more of network links 110A becomes shut down. However, network traffic continues across the remaining functioning network links 110A.

Providing a plurality of network links 110A is sometimes economically feasible if the distance between network switch 104 and network switch 106 is relatively short. However, as the distance between network switches increases, it becomes cost prohibitive to provide a plurality of network links 110A.

SUMMARY OF THE INVENTION

In accordance with one embodiment of the present invention, a method includes receiving information with a transmit load balancing engine of a first network switch; subdividing the information across virtual channels of the first network switch; receiving the information with a receive load balancing engine of a second network switch; and subdividing the information across corresponding virtual channels of the second network switch.

In accordance with one embodiment, the information is subdivided across the corresponding virtual channels of the second network switch in the same manner as the information is subdivided across the virtual channels of the first network switch. Accordingly, the information is directed across the same corresponding virtual channels in both the first and second network switches.

By directing the information across the same corresponding virtual channels in both the first and second network switches, any congestion in the second network switch results only in packet dropping associated with the particular congested virtual channel. However, information continues to move across the remaining uncongested virtual channels. As a result, even if congestion occurs in the second network switch, information continues to flow across the single network link between the first and second network switches, i.e., the single network link is not shut down.

The present invention is best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

In accordance with one embodiment of the present invention, information is directed across the same corresponding virtual channels Vc0-Vc7 in both a transmit network switch 202 (FIGS. 2A and 2B) and a receive network switch 204. As a result, any congestion in receive network switch 204 results only in packet dropping associated with the particular congested virtual channel Vc0-Vc7. However, information continues to move across the remaining uncongested virtual channels Vc0-Vc7. As a result, even if congestion occurs in receive network switch 204, information continues to flow across the single network link 208 between network switches 202 and 204, i.e., the single network link 208 is not shut down.

Figure 1:
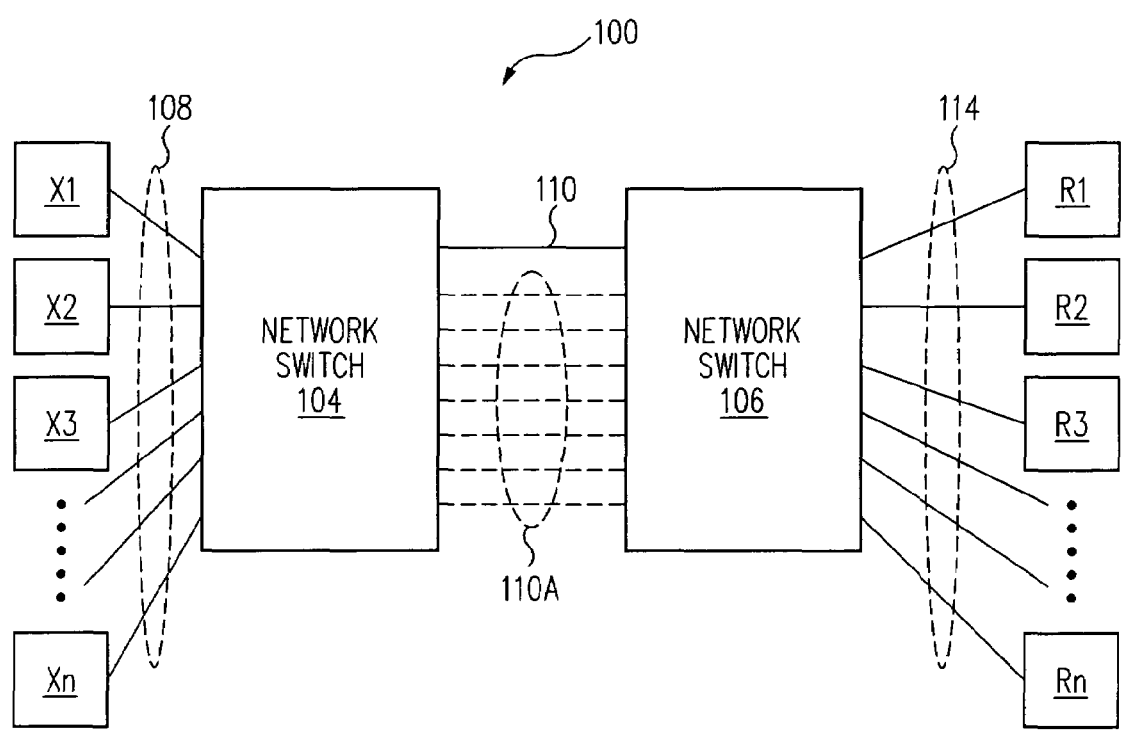
FIG. 1 is a schematic diagram of a network in accordance with the prior art.
Figure 2A:
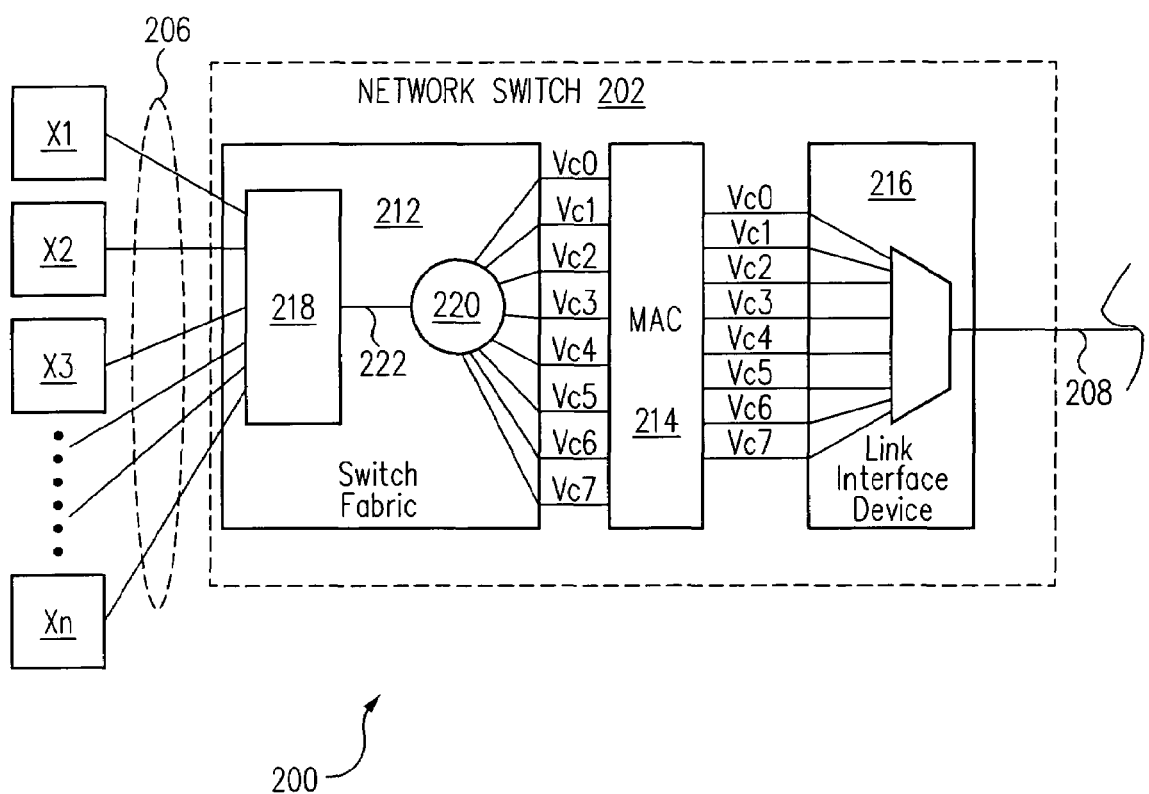
FIG. 2 is a key to FIGS. 2A and 2B, which are a schematic diagram of a network utilizing network switches in accordance with one embodiment of the present invention.
Figure 2B:
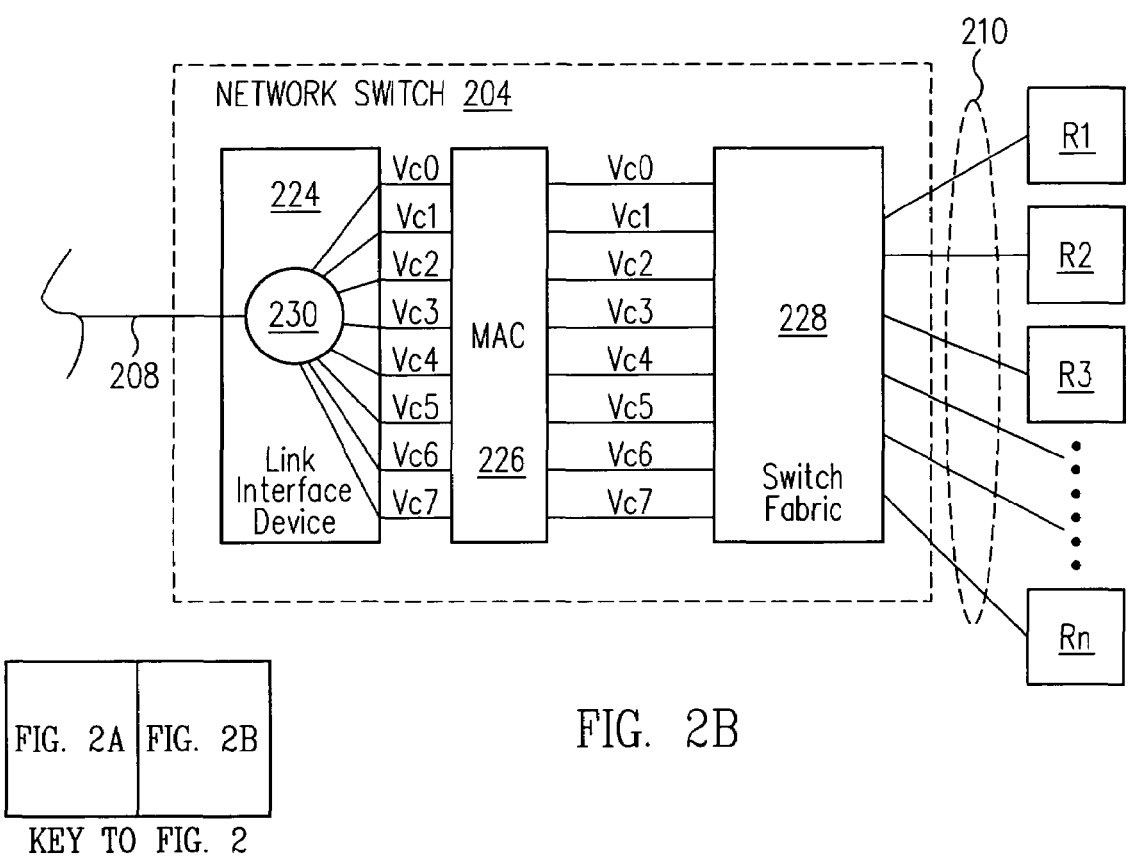

More particularly, FIG. 2 is a key to FIGS. 2A and 2B, which are a schematic diagram of a network 200 utilizing network switches 202, 204 in accordance with one embodiment of the present invention. Referring now to FIGS. 2A and 2B together, a plurality of transmitting network devices X1-Xn are coupled by a plurality of network device links 206 to a network switch 202, sometimes called a first network switch.

Illustratively, network device links 206 are 100 Mb/s links, however, network device links 206 are other links, e.g., having other bandwidth, in other embodiments. Network switch 202 arbitrates and allocates bandwidth between network device links 206 and thus transmitting network devices X1-Xn.

Network switch 202 is coupled to a network switch 204, sometimes called a second network switch, by a network link 208, e.g., a 10 Gb/s ethernet link, however, network link 208 is a different link in other embodiments, e.g., has other bandwidth. A plurality of receiving network devices R1-Rn are coupled by a plurality of network device links 210 to network switch 204.

Illustratively, network device links 210 are also 100 Mb/s links, however, network device links 210 are other links, e.g., having other bandwidth, in other embodiments. Network switch 204 arbitrates and allocates bandwidth between network device links 210 and thus receiving network devices R1-Rn.

Transmitting network devices X1-Xn and receiving network devices R1-Rn, in one embodiment, are portable computers, workstations, two-way pagers, cellular telephones, digital wireless telephones, personal digital assistants, server computers, internet appliances, or any desired combination of these devices that can send or receive information over network 200.

Transmitting network devices X1-Xn and receiving network devices R1-Rn are discussed herein as being transmitters and receivers, respectively, of information, e.g., packets, frames, sessions, source-destination pairs, sometimes called traffic, across network 200 for simplicity of discussion. However, in one embodiment, network devices X1-Xn and/or network devices R1-Rn are capable of transmitting, receiving, or both transmitting and receiving information across network 200.

Network switch 202 includes a switch fabric 212, a media access controller (MAC) 214, and a link interface device 216. Switch fabric 212 provides buffer memory capability and includes an interface port 218 communicatively coupled to network device links 206 and thus transmitting network devices X1-Xn.

Switch fabric 212 further includes a transmit load balancing engine 220 communicatively coupled to interface port 218. Interface port 218 receives traffic from transmitting network devices X1-Xn across network device links 206. Interface port 218 directs the traffic to transmit load balancing engine 220.

In accordance with this embodiment, network switch 202 includes a single transmit load balancing engine 220 and associated MAC 214, link interface device 216 communicatively coupled to network link 208. However, in other embodiments, interface port 218 is communicatively coupled to a plurality of transmit load balancing engines 220 and associated MACs 214, link interface devices 216, which, in turn, are communicatively coupled to a plurality of network links.

Generally, interface port 218 performs a destination/aggregation function. More particularly, interface port 218 takes traffic from multiple sources, e.g., transmitting network devices X1-Xn, and aggregates the traffic destined for a common destination into a single network link, e.g., network link 208 and the associated transmit load balancing engine 220, MAC 214, and link interface device 216.

Transmit load balancing engine 220 directs traffic across virtual channels Vc0-Vc7. Although eight virtual channels Vc0-Vc7 are illustrated and discussed, in alternative embodiments, more or less than eight virtual channels are used.

Further, if a single channel 222 is coming into transmit load balancing engine 220, channel 222 gets subdivided into virtual channels Vc0-Vc7, sometimes called transmit virtual channels Vc0-Vc7. Although only a single channel 222 is illustrated, in other embodiments, two, four or more channels 222 come into transmit load balancing engine 220.

To illustrate, in one embodiment, two channels 222 come into transmit load balancing engine 220. One of the two channels 222 is subdivided into virtual channels Vc0-Vc3 and the other of the two channels 222 is subdivided into virtual channels Vc4-Vc7.

To further illustrate, in another embodiment, four channels 222 come into transmit load balancing engine 220. The four channels 222 are subdivided into virtual channels Vc0-Vc1, Vc2-Vc3, Vc4-Vc5, Vc6-Vc7, respectively.

Referring again to the embodiment of a single channel 222 into transmit load balancing engine 220 as illustrated in FIG. 2A, transmit load balancing engine 220 uses an algorithm, e.g., a hashing algorithm, to direct (subdivide) the traffic across virtual channels Vc0-Vc7.

For example, some aspect of the incoming frame is used by transmit load balancing engine 220 to calculate a "sub channel identifier", which is used to determine which of virtual channels Vc0-Vc7 the frame will be transmitted across. In one embodiment, the sub channel identifier is a 3-bit value corresponding to one of virtual channels Vc0-Vc7. In one specific example, specific field(s), e.g., the layer 2, 3, or 4 address fields as defined by the OSI networking standards abstract model, of the incoming frame are hashed to calculate the sub channel identifier.

In one embodiment, transmit load balancing engine 220 subdivides the traffic such that each source-destination pair is sent across only one of virtual channels Vc0-Vc7, i.e., a source-destination pair is not subdivided across multiple virtual channels. As those of skill in the art understand, a source-destination pair is information from a particular source, e.g., from transmit network device X1, destined for a particular destination, e.g., receive network device R1. A source-destination pair is typically broken into a plurality of packets.

Switch fabric 212, and more particularly, transmit load balancing engine 220 are communicatively coupled to MAC 214 by virtual channels Vc0-Vc7. In one embodiment, virtual channels Vc0-Vc7 are the logical equivalent of eight 1 Gb/s ports.

MAC 214 handles the MAC layer functionality, i.e., the second layer functionality, and manages access to the network itself. For example, MAC 214 handles I/O addressing and packetizing of data.

MAC 214 is communicatively coupled to link interface device 216. Link interface device 216 is communicatively coupled to network link 208. Link interface device 216 performs a multiplexing function on virtual channels Vc0-Vc7 and transmits the traffic across virtual channels Vc0-Vc7 out on network link 208. More particularly, link interface device 216 multiplexes virtual channels Vc0-Vc7 on to network link 208. For example, link interface device 216 sends packets from virtual channels Vc0-Vc7 out onto network link 208 in a round-robin fashion.

In one embodiment, the ordering of packets, which form a source-destination pair, is maintained through network switch 202 and across the particular virtual channel Vc0-Vc7 on which the source-destination pair is directed. More particularly, for each source-destination pair, the packet order is maintained through switch fabric 212, MAC 214 and link interface device 216.

To illustrate a simple case, a source-destination pair includes three packets P1, P2, P3, in that order. After passing through network switch 202, packets P1, P2, P3 are transmitted out on network line 208 in the same order, i.e., packets P1, P2, P3. However, it is not necessary that packets P1, P2, P3 be transmitted out on network line 208 immediately following one another, i.e., other packets can come between packets P1, P2, P3 on network line 208.

Network switch 204 includes a link interface device 224, a MAC 226, and a switch fabric 228. Link interface device 224 includes a receive load balancing engine 230 communicatively coupled to network link 208. Receive load balancing engine 230 receives traffic from network switch 202 across network link 208, i.e., a channel.

Receive load balancing engine 230 directs the traffic across virtual channels Vc0-Vc7, sometimes called receive virtual channels Vc0-Vc7. More particularly, receive load balancing engine 230 subdivides network link 208 into virtual channels Vc0-Vc7. Although eight virtual channels Vc0-Vc7 are illustrated and discussed, in alternative embodiments, more or less than eight virtual channels are used.

More particularly, the number of virtual channels of network switch 204 directly corresponds to the number of virtual channels of network switch 202. Accordingly, since network switch 202 includes virtual channels Vc0-Vc7, i.e., eight virtual channels, network switch 204 also includes virtual channels Vc0-Vc7, i.e., eight virtual channels. However, if network switch 202 includes more or less than eight virtual channels, network switch 204 will also include the corresponding number of virtual channels.

Referring again to network switch 204, receive load balancing engine 230 uses an algorithm, e.g., a hashing algorithm, to direct (subdivide) the traffic across virtual channels Vc0-Vc7. In one embodiment, receive load balancing engine 230 uses the exact same algorithm as transmit load balancing engine 220. Accordingly, any frame or source-destination pair transmitted across a particular virtual channel Vc0-Vc7 by transmit load balancing engine 220 will be transmitted across the same particular virtual channel Vc0-Vc7 by receive load balancing engine 230.

In this manner, information is subdivided across virtual channels Vc0-Vc7 of network switch 204 in the exact same manner as the information is subdivided across virtual channels Vc0-Vc7 of network switch 202. Effectively, virtual channels Vc0-Vc7 of network switch 202 are virtually coupled to virtual channels Vc0-Vc7 of network switch 204 across network link 208.

For example, load balancing engine 220 uses an algorithm to determine that a first frame or source-destination pair should be transmitted over virtual channel VcO of network switch 202. Load balancing engine 220 transmits the first frame or source-destination pair over virtual channel VcO of network switch 202.

This first frame is received by receive load balancing engine 230 across network link 208. Receive load balancing engine 230 uses the same algorithm as load balancing engine 220 to determine that the first frame or source-destination pair should be transmitted over virtual channel VcO of network switch 204. Receive load balancing engine 230 transmits the first frame or source-destination pair over virtual channel VcO of network switch 204.

Link interface device 224, and more particularly, receive load balancing engine 230, is communicatively coupled to MAC 226 by virtual channels Vc0-Vc7. In one embodiment, virtual channels Vc0-Vc7 are the logical equivalent of eight 1 Gb/s ports.

MAC 226 handles the MAC layer functionality, i.e., the second layer functionality. For example, MAC 226 depacketizes the data, and verifies the CRC pattern at the end of the packet.

MAC 226 is communicatively coupled to switch fabric 228 by virtual channels Vc0-Vc7. Switch fabric 228 is communicatively coupled to network device links 210 and thus receive network devices R1-Rn. Switch fabric 228 directs the traffic coming across virtual channels Vc0-Vc7 to network device links 210 and thus to receive network devices R1-Rn. Switch fabric 228 also provides buffer memory capability.

In one embodiment, the ordering of packets, which form a source-destination pair, is maintained through network switch 204 and across the particular virtual channel Vc0-Vc7 on which the source-destination pair is directed. More particularly, for each source-destination pair, the packet order is maintained through link interface device 224, MAC 226, and switch fabric 228.

By directing frames or source-destination pairs across the same virtual channels Vc0-Vc7 in both network switch 202 and network switch 204, any congestion in network switch 204 results only in packet dropping associated with the particular congested virtual channel Vc0-Vc7. However, traffic continues to move across the remaining uncongested virtual channels Vc0-Vc7. As a result, even if congestion occurs in network switch 204, traffic continues to flow across network link 208, i.e., network link 208 is not shut down. The dropped packets are detected and resent by higher level protocols in a conventional manner.

For example, assume a case where transmitting network devices X1 and X2 each send 100 Mb/s traffic, for a total of 200 Mb/s, destined for receiving network device R1. For simplicity of discussion, assume that this 200 Mb/s of traffic from transmitting network devices X1 and X2 is sent across virtual channel VcO by transmit load balancing engine 220 and receive load balancing engine 230.

Since network device link 210 between receiving network device R1 and network switch 204 is a 100 Mb/s link, congestion occurs in network switch 204 and on virtual channel Vc0. As a result of this congestion, network switch 204 drops incoming packets, but only on virtual channel Vc0, until the congestion is alleviated.

However, only virtual channel Vc0 is effectively shut down. Network traffic continues across the remaining functioning virtual channels Vc1-Vc7 and thus continues across network link 208 between network switch 202 and network switch 204. Thus, in accordance with this embodiment of the present invention, congestion in network switch 204 occurs without shutting down network link 208 between network switch 202 and network switch 204.

This disclosure provides an exemplary embodiment of the present invention. The scope of the present invention is not limited by this exemplary embodiment. Numerous variations, whether explicitly provided for by the specification or implied by the specification or not, may be implemented by one of skill in the art in view of this disclosure.

What is claimed is:

1. A network comprising:
a first network switch comprising a transmit load balancing engine for subdividing at least a first channel into a plurality of transmit virtual channels of the first network switch;
a second network switch comprising a receive load balancing engine; and
a network link between the first network switch and the second network switch, wherein the first network switch further comprises a link interface device for multiplexing the plurality of transmit virtual channels on to the network line, and wherein the receive load balancing engine subdivides the network link into a plurality of receive virtual channels of the second network switch, equal in number to the plurality of transmit virtual channels of the first network switch.

2. The network of claim 1 wherein the transmit virtual channels are virtually coupled to the receive virtual channels across the network link.

3. The network of claim 1 wherein the transmit load balancing engine uses an algorithm to direct traffic across the transmit virtual channels.

4. The network of claim 3 wherein the receive load balancing engine uses the algorithm to direct traffic across the receive virtual channels.

5. The network of claim 1 further comprising a network device communicatively coupled to the first network switch.

6. The network of claim 1 further comprising a network device communicatively coupled to the second network switch.

7. The network of claim 1 wherein the network link is a 10 Gb/s ethernet link.

8. The network of claim 1 wherein the first network switch comprises a switch fabric comprising the transmit load balancing engine.

9. The network of claim 8 wherein the switch fabric further comprises an interface port communicatively coupled to the transmit load balancing engine.

10. A method in a network comprising:
receiving information at a load balancing engine of a first network switch;
load balancing the information across a plurality of virtual channels of the first network switch; and
sending the information to a load balancing engine of a second network switch, wherein the load balancing engine of the second network switch to subdivide the information across an equal number of virtual channels of the second network switch corresponding to the plurality of virtual channels of the first network switch.

11. The method of claim 10 wherein the load balancing engine of the second network switch to subdivide the information across the equal number of virtual channels of the second network switch comprises:
the load balancing engine of the second network switch to allocate the information across the equal number of virtual channels of the second network switch in a same manner as the first network switch load balanced the information across the plurality of virtual channels of the first network switch.

12. The method of claim 11 wherein the information comprises a first frame, and wherein load balancing the information across the plurality of virtual channels of the first network switch comprises:
determining that the first frame is to be transmitted over a first virtual channel of the plurality of virtual channels of the first network switch.

13. The method of claim 12 wherein the load balancing engine of the second network switch to subdivide the information across an equal number of virtual channels of the second network switch comprises:
determining that the first frame is to be transmitted over a first corresponding virtual channel of the virtual channels of the second network switch.

14. The method of claim 13 wherein congestion occurs on the first corresponding virtual channel, and wherein the method further comprises dropping incoming packets on the first corresponding virtual channel.

15. The method of claim 14 wherein the information continues across remaining virtual channels of the second network switch.

16. The method of claim 11 wherein the information comprises a source-destination pair, and wherein load balancing the information across the virtual channels of the first network switch comprises:
determining that the source-destination pair is to be transmitted over a first virtual channel of the virtual channels of the first network switch.

17. A switch fabric comprising:
a first network switch having a first channel, the first channel comprising a first plurality of virtual channels;
a second network switch having a second channel, the second channel comprising a second plurality of virtual channels corresponding to the first plurality of virtual channels;
a single network link communicatively connecting the first network switch and the second network switch;
a load balancing engine to load balance data traffic among the first plurality of virtual channels;
means for transmitting the data traffic from the first network switch to the second network switch over the single network link; and
means for receiving the data traffic at the second network switch via the single network link, wherein a receive load balancing engine of the second network switch distributes the data traffic among the second plurality of virtual channels corresponding to the first plurality of virtual channels.

18. The switch fabric of claim 17 wherein the load balancing engine to load balance the data traffic comprises:
means for load balancing the data traffic via a hashing algorithm, or via distribution of source-destination pairs of the data traffic among the plurality of virtual channels, or both.

* * * * *